United States Patent [19]

Baker, Jr. et al.

[11] Patent Number: 5,500,452
[45] Date of Patent: Mar. 19, 1996

[54] SOFT, LOW DENSITY FLEXIBLE POLYURETHANE FOAM

[75] Inventors: Otis M. Baker, Jr.; Frank E. Critchfeld, both of South Charleston; Paul M. Westfall, St. Albans, all of W. Va.

[73] Assignee: ARCO Chemical Technology, L.P., Greenville, Del.

[21] Appl. No.: 311,378

[22] Filed: Sep. 23, 1994

[51] Int. Cl.⁶ .............................. C08G 18/10; C08G 18/12
[52] U.S. Cl. ........................ 521/130; 521/137; 521/163; 521/176
[58] Field of Search .................................. 521/137, 130, 521/163, 176

[56] References Cited

U.S. PATENT DOCUMENTS 4,421,872  12/1983  Büthe et al. .......................... 521/174
4,883,825  11/1989  Westfall et al. ....................... 521/112

*Primary Examiner*—Morton Foelak
*Attorney, Agent, or Firm*—Dennis M. Kozak

[57] ABSTRACT

A flexible polyurethane foam formulation comprising a first polyol, a second polyol, an unhindered primary diamine or its corresponding carbamate, a diol, water, at least one catalyst, a foam stabilizer and isocyanate is disclosed. No auxiliary blowing agent is required. The resulting soft foams have densities of less than about 2 pcf and 25% IFD values of less than about 10 pounds/50 sq. inches.

25 Claims, No Drawings

SOFT, LOW DENSITY FLEXIBLE POLYURETHANE FOAM

BACKGROUND OF THE INVENTION

This invention relates to flexible polyurethane foam. More specifically, this invention relates to very soft, low density, flexible polyurethane foam produced without using an auxiliary blowing agent. The foam formulations of this invention can be molded into polyurethane foam that is suitable for use as a substitute for polyester fiberfill in furniture applications.

Flexible molded polyurethane foam is recognized as the standard cushioning material for automotive seating. Molded polyurethane foam has not, however, succeeded in capturing much of the furniture market where polyester fiberfill is the cushioning material of choice due to its softness. For molded polyurethane foam to be considered as a substitute for polyester fiberfill in furniture applications, a very soft, low density, flexible polyurethane foam is needed. Prior attempts to modify the chemistry of auxiliary blowing agent free moldable polyurethane foam formulations to obtain soft, low density foams to replace polyester fiberfill have encountered myraid problems.

It is known in the art that to produce a polyurethane foam having the required low density and softness that a large amount of water needs to be incorporated into the foam formulation. It is also known that to obtain the softness required for furniture applications, it is necessary to run at low isocyanate indices. Running at low isocyanate indices, however, exacerbates the density problem, because at a low index the carbon dioxide produced by the water is reduced. Hence, the density reduction achieved with each additional part of water is reduced. Furthermore, as the amount of water is increased at lower isocyanate indices, the reaction of the water slows. As a result, water (probably in the form of steam) migrates to the surface of the foam mold where it condenses. This water on the mold surface subsequently reacts with isocyanate fumes and imparts a harsh, opaque, urea-rich surface to the foam part. Although this surface problem can be partially alleviated by further lowering the isocyanate index, doing so results in higher compression set properties and slower demold times. Increasing the mold temperature would probably help, but is not feasible due to the operating temperature ranges of commercial mold release agents. In addition to the harsh surface problem described above, prior attempts to produce the desired very soft, low density molded polyurethane foams have resulted in unstable foams and in foams which exhibit a significantly higher propensity to "hot" crusher set.

U.S. Pat. Nos. 4,883,825 and 4,421,872 teach flexible molded polyurethane foam formulations which yield low density foams. However, these foams are automotive seating foams and are much too firm for use as a substitute for polyester fiberfill in furniture applications. More specifically, U.S. Pat. No. 4,883,825 teaches a process for the manufacture of low density flexible polyurethane foam via the reaction of a highly reactive polymer polyol containing a high primary hydroxyl content, a hydrophilic polyhydric compound, and water, with a polyisocyanate. The process produces low density, rapid demold systems for high resilience molded foam parts such as automotive seating. These foams however are much firmer than the foams of this invention and are not suitable for use as a substitute for polyester fiberfill in furniture and bedding applications. U.S. Pat. No. 4,421,872 teaches the use of a highly reactive polyol for the manufacture of flexible polyurethane foam. Also taught is the use of crosslinkers/chain extenders such as diamines and short chain diols as a way to increase foam firmness. The resulting foams are not very soft and, accordingly, are not suitable to replace polyester fiberfill in furniture and bedding applications.

The present invention overcomes many of the problems encountered in the prior art by providing a new polyurethane foam formulation which facilitates the molding of very soft, low density, flexible polyurethane foam. No auxiliary blowing agent, such as methylene chloride or a halogenated hydrocarbon, is required in the foam formulation of this invention.

SUMMARY OF THE INVENTION

According to the invention there is provided a flexible polyurethane foam formulation comprising a first polyol, a second polyol, an unhindered primary diamine or its corresponding carbamate, a diol, water, at least one catalyst, a foam stabilizer, and isocyanate wherein, a) the first polyol is a polyether polyol having 80% or more primary hydroxyl groups, a nominal functionality of at least 3, and an oxyethylene content of from about 10 to about 30% by weight;

b) the second polyol is a polymer/polyol formed by the in situ polymerization of at least one ethylenically unsaturated monomer in a third polyol;

c) the third polyol is a polyether polyol having 80% or more primary hydroxyl groups, a nominal functionality of at least 3, and an oxyethylene content of from about 10 to about 30% by weight;

d) the unhindered primary diamine or its corresponding carbamate is present in an amount of from about 0.1 to about 1.0 part per each 100 parts of total first and second polyol;

e) the diol has a molecular weight of 300 or less and is present in an amount of from about 1 to about 10 parts per each 100 parts of total first and second polyols;

f) the water is present in an amount of from about 4 to about 20 parts per each 100 parts of total first and second polyols;

g) the isocyanate is a mixture of toluene diisocyanate and either diphenylmethane diisocyanate or a polymeric diphenylmethane diisocyanate, or both;

h) only the carbon dioxide which is generated by the catalyzed reaction of the isocyanate with the water is used to blow the foam formulation, and;

wherein the foam formulation, upon foaming, produces a foam having a density of less than about 2 pounds per cubic foot and a 25% Indentation Force Deflection value of less than about 10 pounds per 50 square inches, both measured in accordance with ASTM D-3574.

DETAILED DESCRIPTION OF THE INVENTION

The polyurethane foam formulation of this invention has a composition falling within the ranges as shown below:

| Material | Range (Parts by Weight)[1] | Preferred Range (Parts by Weight)[1] |
| --- | --- | --- |
| First polyol | 80–99 | 90–98 |
| Second polyol - (polymer/polyol[2]) | 1–20 | 2–10 |
| Primary Diamine | 0.1–1 | 0.3–0.6 |
| Diol | 1–10 | 3–6 |
| Water | 4–20 | 5–8 |
| Catalyst | 0.1–0.5 | 0.1–0.5 |
| Stabilizer | 0.4–1.0 | 0.5–0.8 |
| Mixed Diisocyanate[3] Index | 50–85 | 60–75 |

[1]As used herein, the term "parts by weight" means 100 total parts of the first and second polyols with the amounts of all other materials being recited as parts by weight per each 100 parts of first and second polyol.
[2]The base polyol employed in the polymer/polyol is also referred to as the third polyol. The second polyol contains from about 40 to about 90 weight percent, preferably about 55 to about 65 weight percent of the third polyol.
[3]TDI/MDI ratio (60–80%/40–20%); preferred (80–75%/20–25%).

In practicing this invention, any suitable polyols having the characteristics recited above, can be employed as the first, second, and third polyols. Moreover, the first and third polyols can be the same or different polyols so long as they are separately selected to have the recited characteristics. In one preferred embodiment of the invention, the first polyol and/or the third polyol contains 85% or more primary hydroxyl groups. The second polyol can be any suitable polymer/polyol produced by the in situ polymerization of one or more ethylenically unsaturated monomers in a base polyol (the third polyol). U.S. Pat. No. 4,883,825, at columns 3–5 under the subheading "Polyol" describes polyether polyols and polymer/polyols which are suitable for use in this invention as the first, second, and third polyols. The description is incorporated herein by reference thereto. Preferably, the second polyol (i.e. the polymer/polyol) is prepared by the in situ polymerization of styrene and acrylonitrile monomers (in a weight % ratio of from 50/50 to 90/10) in base polyol, to a polymer solids content of from about 10 to about 60 wt %, preferable from about 35 wt% to about 45 wt%.

We have discovered that the use of a small amount, from about 0.1 to about 1.0 of an unhindered primary diamine or its corresponding carbamate, in the foam formulation surprisingly serves as a cell opener in the foam formulations of the invention. This discovery was surprising because one skilled in the art of preparing polyurethane foam would expect the inclusion of a small amount of a diamine to cause a very fast crosslinking type reaction between the diamine and diisocyanate, resulting in a highly gelled, tight foam. Conversely, we found that it gave a more open, less stable foam.

As used herein, the term "corresponding carbamate" means the carbamate which decomposes in water to unhindered primary diamine and carbon dioxide. For example, hexamethylene diamine carbamate decomposes in water to hexamethylene diamine and carbon dioxide.

Any suitable unhindered primary diamine can be used including hexamethylene diamine, 1,3-diamino propane, 1,9-diamino nonane 1,4-phenylene diamine, and the like, and their mixtures. Carbamates corresponding to the primary diamines, such as hexamethylene diamine carbamate, can also be used. As shown in Example 7, piperazine (a secondary diamine) is not suitable for use in the foam formulations of this invention.

Any diol with a molecular weight of less than 300 can be employed in the invention. Suitable diols include diethylene glycol, dipropylene glycol, tripropylene glycol, 2-methyl 1,3-propane diol, and the like, and their mixtures.

Any suitable mixture of toluene diisocyanate (TDI) with diphenylmethane diisocyanate (MDI) alone, or mixed with its polymeric forms, is suitable for use. Suitable mixed (TDI/MDI) isocyanate products are commercially available and typically contain 80% TDI and 20% MDI or 75% TDI and 25% MDI. One particularly suitable mixed TDI/MDI (75%/25%) isocyanate is designated Lupranate 7525 Isocyanate, commercially available from BASF Corporation.

Suitable catalysts and stabilizers can be employed in conventionally employed amounts to catalyze the polyurethane reaction and stabilize the foam. Suitable catalysts and stabilizers and conventional amounts are recited in columns 7–5 of U.S. Pat. No. 4,883,825, which are incorporated herein by reference thereto.

This invention is demonstrated by the following Examples using the following

Materials

Polyol 1—A polyol made by reacting propylene oxide with a sorbitol based starter in the presence of potassium hydroxide catalyst, capping with ethylene oxide and refining to remove the catalyst. The polyol contains about 16% ethylene oxide as a cap and has a hydroxyl number of about 28.

Polyol 2—A polymer/polyol sold by ARCO Chemical Company as ARCOL® E-815 polyol. It contains 43 percent polymer and has a hydroxyl number of about 20. The base "third" polyol contains about 19% ethylene oxide as a cap and has a hydroxyl number of about 35.

Low Molecular Weight Polyol—A polyol made by reacting glycerine with ethylene oxide to number average molecular weight of about 1000.

Isocyanate—A blend of tolylene diisocyanate and diphenylmethane diisocyanate sold by BASF Corporation as Lupranate 7525 Isocyanate.

Catalyst 1—A polyurethane foam catalyst sold as NIAX Catalyst A-1 by OSi Specialties Inc.

Catalyst 2—A polyurethane foam catalyst sold by Air Products and Chemicals Corporation Inc. as Polycat 77 catalyst.

Catalyst 3—An organo tin compound sold by Air Products and Chemicals Corp. as T-120 catalyst.

Surfactant—A silicone surfactant sold as Silicone Surfactant Y-10,515 by OSi Specialties Inc.

Flame Retardant—A halo-organic phosphorous compound sold by Great Lakes Chemical Company as DE-60F Special Flame Retardant.

EXAMPLE 1

This example illustrates two polyurethane foam formulations according to the invention and further demonstrates a procedure for the production of molded polyurethane foams. The following materials and amounts were used in the foam formulations:

| | Foam Formulation: | |
| --- | --- | --- |
| | A | B |
| Materials: | Parts by Weight | |
| Polyol 1 | 96.00 | 96.00 |
| Polyol 2 | 4.00 | 4.00 |
| Diol - (Diethylene Glycol) | 3.00 | 3.00 |
| Water | 6.50 | 6.50 |

|                                        | Foam Formulation: |          |
|----------------------------------------|-------------------|----------|
|                                        | A                 | B        |
| Materials:                             | Parts by Weight   |          |
| Low Molecular Weight Polyol (LMWP)     | 0.50              | 0.50     |
| Catalyst 1                             | 0.29              | 0.29     |
| Catalyst 2                             | 0.05              | 0.05     |
| Primary Diamine - (Hexamethylene Diamine) | 0.4            | 0.4      |
| Surfactant                             | 0.65              | 0.65     |
| Flame Retardant                        | 2.00              | 2.00     |
| Isocyanate                             | 60 Index          | 70 Index |

Each foam formulation and the corresponding foam was separately prepared using the following procedures.

All of the above materials (except the Isocyanate) were introduced into a mixing vessel and mixed at about 4,000 rpm for about 55 seconds. After mixing was stopped, Isocyanate was quickly added and mixing was restarted and continued for about another 5 seconds. After mixing was stopped, the contents of the mixing vessel were immediately poured into a self-contained, air bag closure, aluminum mold (15"×15"×5") at a mold temperature of 150° F. The mold was spray coated with a conventional mold release agent. The lid of the mold was immediately closed and latched and the air bag was inflated to quickly seal the mold. The foaming mixture in the mold was allowed to foam and fill the mold. The mold was fitted with 1/16" vents on all four corners and some foam extruded through these vents thereby expelling the air in the mold. The foam was allowed to set in the mold for 3 to 5 minutes-until cured enough to allow demolding. After setting, the air bag was deflated to relieve pressure in the mold and to allow mold declamping. The resulting polyurethane foam molded part was removed, crushed by passing it through crushing rollers (90%) to open the foam cells, and post cured for 30 minutes in a 250° F. forced air oven. The molded foam part was placed in a constant temperature (72° F.), constant humidity (50% R.H.) room and conditioned for about 24 hours before it was tested for physical properties.

Foam A and B molded parts were tested to determine physical properties and the results are set forth in following Table 1.

TABLE 1

| Physical Properties of Molded Foams A and B | | |
|---|---|---|
| Molded Foam: | A | B |
| Physical Properties: | | |
| Density[1], pcf | 1.67 | 1.56 |
| Resiliency[2], % Ball Rebound | 41.0 | 56 |
| IFD[3], Thickness, Inches | 4.48 | 4.73 |
| 25% Deflection (lbs/50 sq. in.) | 3.70 | 6.97 |
| 50% Deflection (lbs/50 sq. in.) | 7.05 | 12.61 |
| 65% Deflection (lbs/50 sq. in.) | 11.46 | 19.44 |
| IFD[4], 65/25 Ratio | 3.10 | 2.79 |
| Tensile Strength[5], psi | 8.9 | 10.5 |
| Elongation[6], % | 149 | 149 |
| Tear Strength[7], pli | 0.56 | 0.83 |
| Compression Set[8], 75% | 6.03 | 14.88 |
| Humid Aged Compression Set[9], 50% | 44 | 32 |
| JIS Wet Set[10], % | 48 | 43 |

[1]ASTM D-3574, Test D.
[2]ASTM D3574
[3]ASTM D-3574 Test B1 and Test B2
[4]IFD, 65% value divided by IFD, 25% value TABLE 1-continued

| Physical Properties of Molded Foams A and B | | |
|---|---|---|
| Molded Foam: | A | B |

[5]ASTM D-3574
[6]ASTM D-3574
[7]ASTM D-3574
[8]ASTM D-3574
[9]ASTM D-3574, Test D
[10]Japanese Industrial Standard Test

EXAMPLE 2

Using substantially the mixing and molding procedures described in Examples 1, four more molded foam parts were prepared and tested to determine their physical properties. In each of the four foam formulations, a different diol was employed. All four foam formulations are according to the invention. They were formulated as follows:

|  | Foam Formulation: | | | |
|---|---|---|---|---|
|  | C | D | E | F |
| Materials: | Parts by Weight | | | |
| Polyol 1 | 96.00 | 96.00 | 96.00 | 96.00 |
| Polyol 2 | 4.00 | 4.00 | 4.00 | 4.00 |
| Diol - (Diethylene Glycol) | 3.00 | — | — | — |
| Diol - (Dipropylene Glycol) | — | 3.00 | — | — |
| Diol - (Tripropylene Glycol) | — | — | 3.00 | — |
| Diol - (2-Methyl 1,3 Propane Diol) | — | — | — | 3.00 |
| Water | 6.50 | 6.50 | 6.50 | 6.50 |
| LMWP | 0.50 | 0.50 | 0.50 | 0.50 |
| Catalyst 1 | 0.36 | 0.36 | 0.36 | 0.36 |
| Catalyst 2 | 0.06 | 0.06 | 0.06 | 0.06 |
| Surfactant | 0.60 | 0.60 | 0.60 | 0.60 |
| Flame Retardant | 2.00 | 2.00 | 2.00 | 2.00 |
| Primary Diamine - (Hexamethylene Diamine) | 0.30 | 0.30 | 0.30 | 0.30 |
| Isocyanate (60 Index) | 47.72 | 47.05 | 46.28 | 48.30 |

Molded foams C–F were tested to determine their physical properties which are shown in Table 2.

TABLE 2

| Physical Properties of Molded Foams C–F | | | | |
|---|---|---|---|---|
| Molded Foam: | C | D | E | F |
| Physical Properties: | | | | |
| Density, pcf | 1.57 | 1.58 | 1.7 | 1.7 |
| Resiliency, % | 54 | 55 | 49 | 50 |
| IFD, Thickness (inches | 4.55 | 4.71 | 4.43 | 4.64 |
| 25% Deflection (lbs/50 sq. in.) | 5.03 | 5.53 | 5.18 | 5.82 |
| 50% Deflection (lbs/50 sq. in.) | 9.40 | 10.18 | 10.10 | 10.62 |
| 65% Deflection (lbs/50 sq. in.) | 14.73 | 15.70 | 16.30 | 16.38 |
| IFD 65/25 Ratio | 2.93 | 2.84 | 3.15 | 2.81 |
| Tensile Strength, psi | 8.67 | 7.95 | 7.60 | 8.77 |
| Elongation, % | 146 | 145 | 154 | 142 |
| Tear Strength, pli | 0.61 | 0.61 | 0.67 | 0.63 |
| Compression Set, 75% | 26 | 19 | 25 | 25 |
| Humid Aged Compression Set, 50% | 27 | 30 | 35 | 34 |
| JIS Wet Set, % | 40 | 42 | 44 | 44 |

As shown from the data in Table 2, foam formulations C–F of this invention produced low density, very soft molded foams.

EXAMPLE 3

This example illustrates three foam formulations of this invention (G, H and I) and a control foam formulation (C-1)

which did not employ any primary diamine. This example further demonstrates a machine procedure for producing molding polyurethane foam pads. The following materials and amounts were employed.

|  | Foam Formulation: | | | |
| --- | --- | --- | --- | --- |
|  | G | H | I | C-1 |
| Materials: | Parts by Weight | | | |
| Polyol 1 | 96.00 | 96.00 | 96.00 | 96.00 |
| Polyol 2 | 4.00 | 4.00 | 4.00 | 4.00 |
| Diol - (Diethylene Glycol) | 4.00 | 4.00 | 4.00 | 4.00 |
| Water | 6.50 | 6.50 | 6.50 | 6.50 |
| LMWP | 0.50 | 0.50 | 0.50 | 0.50 |
| Catalyst 1 | 0.29 | 0.29 | 0.29 | 0.29 |
| Catalyst 2 | 0.05 | 0.05 | 0.05 | 0.05 |
| Surfactant | 0.65 | 0.65 | 0.65 | 0.65 |
| Primary Diamine - (Hexamethylene Diamine) | 0.40 | 0.40 | 0.40 | None |
| Isocyanate (Index) | 60 | 65 | 70 | 70 |

Molded foam pads were separately prepared using the above four foam formulations using an Admiral high pressure mixing machine and the following procedure.

Two material streams were fed to the foam mixing device at a throughput of 50 lb/min. and at a stream temperature of 85° F. The first stream contained all materials except for the Isocyanate. The second feed stream contained only the Isocyanate. The resulting liquid foam mixture was poured into an open aluminum mold (15"×15"×4") at a mold temperature of 150° F. and the mold lid was closed immediately thereafter. The finished molded foam cushion was removed 3 to 5 minutes later. The molded foam cushion was crushed to 90% deflection three times after demolding. The foam was post cured for 30 minutes in an oven preset at 250° F. and foam physical properties were measured after at least one day aging in a constant temperature (72° F.) constant humidity (50% R.H) room. The physical properties for molded foams G, H, I, and C-1 are shown in Table 3.

TABLE 3

| Physical Properties of Molded Foams G–I and C-1 | | | | |
| --- | --- | --- | --- | --- |
| Molded Foam: | G | H | I | C-1 |
| Physical Properties: | | | | |
| Density, pcf | 1.69 | 1.59 | 1.53 | 1.5 |
| Resiliency, % | 40 | 46 | 56 | 30 |
| IFD, Thickness (inches | 4.36 | 4.47 | 4.68 | 3.7 |
| 25% Deflection (lbs/50 sq. in.) | 4.8 | 6.7 | 8.5 | 6.1 |
| 50% Deflection (lbs/50 sq. in.) | 9.1 | 12.5 | 15.7 | 14 |
| 65% Deflection (lbs/50 sq. in.) | 14.6 | 19.3 | 24.3 | 25 |
| IFD 65/25 Ratio | 3.1 | 2.9 | 2.9 | 4.0 |
| Tensile Strength, psi | 8.7 | 8.3 | 12.0 | 12.5 |
| Elongation, % | 149 | 146 | 127 | 142 |
| Tear Strength, pli | 0.46 | 0.63 | 0.62 | 0.8 |
| Compression Set, 75% | 17.5 | 15 | 9.4 | 29 |
| Humid Aged Compression Set, 50% | 35 | 30 | 23 | — |
| JIS Wet Set, % | 38 | 34 | 26 | 40 |

The data of Table 3 show that foam C-1 which did not comprise di-primary amine was significantly inferior to foams G, H, and I which did. Significant physical property differences are seen in resiliency, IFD thickness, IFD 65/25 ratio, and compression set, 75%.

EXAMPLE 4

Using substantially the mixing and molding procedures of Example 1, five molded foams were prepared and tested. The foam formulations designated J–M each employed a different primary diamine. All diamines were run at the same gram equivalents level. Control foam formulation C-2 employed no diamine. Following are the five foam formulations.

|  | Foam Formulation: | | | | |
| --- | --- | --- | --- | --- | --- |
|  | J | K | L | M | C-2 |
| Materials: | Parts by Weight | | | | |
| Polyol 1 | 96.00 | 96.00 | 96.00 | 96.00 | 96.00 |
| Polyol 2 | 4.00 | 4.00 | 4.00 | 4.00 | 4.00 |
| Diol - (Diethylene Glycol) | 3.00 | 3.00 | 3.00 | 3.00 | 3.00 |
| Water | 5.50 | 5.50 | 5.50 | 5.50 | 5.50 |
| LMWP | 0.50 | 0.50 | 0.50 | 0.50 | 0.50 |
| Catalyst 1 | 0.17 | 0.17 | 0.17 | 0.17 | 0.17 |
| Catalyst 2 | 0.04 | 0.04 | 0.04 | 0.04 | 0.04 |
| Surfactant | 0.60 | 0.60 | 0.60 | 0.60 | 0.60 |
| Primary Diamine: | Yes | Yes | Yes | Yes | No |
| Hexamethylene Diamine | 0.3 | — | — | — | — |
| 1,9-Diamino Nonane | — | 0.41 | — | — | — |
| 1,4-Phenylene Diamine | — | — | 0.28 | — | — |
| 1,3-Diamino Propane | — | — | — | 0.19 | — |
| Isocyanate (70 Index) | 48.27 | 48.27 | 48.27 | 48.27 | 47.92 |

The physical properties of molded foams J–M and C-2 are shown in Table 4.

TABLE 4

| Physical Properties of Molded J–M and C-2 Foams | | | | | |
| --- | --- | --- | --- | --- | --- |
| Molded Foams: | J | K | L | M | C-2 |
| Physical Properties: | | | | | |
| Density, pcf | 2.03 | 1.66 | 1.80 | 1.71 | 1.67 |
| Resiliency, % | 53 | 41 | 49 | 51 | 66 |
| IFD, Thickness (inches | 3.92 | 4.00 | 4.01 | 3.94 | 4.57 |
| 25% Deflection (lbs/50 sq. in.) | 6.38 | 5.18 | 6.00 | 5.70 | 8.18 |
| 50% Deflection (lbs/50 sq. in.) | 14.25 | 10.73 | 12.75 | 12.30 | 17.02 |
| 65% Deflection (lbs/50 sq. in.) | 25.20 | 18.98 | 22.05 | 21.75 | 28.88 |
| IFD 65/25 Ratio | 3.93 | 3.67 | 3.67 | 3.82 | 3.53 |
| Tensile Strength, psi | 7.76 | 6.55 | 8.49 | 7.30 | 9.34 |
| Elongation, % | 110 | 120 | 127 | 111 | 131 |
| Tear Strength, pli | 0.70 | 0.56 | 0.68 | 0.64 | 0.80 |
| Compression Set, 75% | 9.79 | 7.71 | 13.21 | 6.86 | 6.80 |
| Humid Aged Compression Set, 50% | 33 | 32 | 40 | 37 | 27 |
| JIS Wet Set, % | 29 | 32 | 29 | 34 | 26 |
| Pad Characteristics | Open | Open | Open | Open | Tight |

Control foam formulation C-2, which contained no primary diamine, resulted in an unacceptably tight foam.

EXAMPLE 5

Using substantially the procedures described in Example 1, four foam formulations were prepared and foamed. Foam formulation (N) was according to the invention and employed hexamethylene diamine carbamate (DIAK). The other three formulations (C-3, C-4, and C-5) were control experiments. Formulation C-3 was identical to formulation N, except no DIAK was added. Formulations C-4 and C-5 contained 1.5 parts by weight of DIAK and hexamethylene diamine, respectively. The foam formulations used were as follows:

| | Foam Formulation: | | | |
|---|---|---|---|---|
| Materials: | N | C-3 | C-4 | C-5 |
| | Parts by Weight | | | |
| Polyol 1 | 96.00 | 96.00 | 96.00 | 96.00 |
| Polyol 2 | 4.00 | 4.00 | 4.00 | 4.00 |
| Diol - (Diethylene Glycol) | 3.00 | 3.00 | 3.00 | 3.00 |
| Water | 7.00 | 7.00 | 7.00 | 7.00 |
| LMWP | 0.50 | 0.50 | 0.50 | 0.50 |
| Catalyst 1 | 0.28 | 0.28 | 0.28 | 0.28 |
| Catalyst 2 | 0.22 | 0.22 | None | None |
| Carbamate - (DIAK) | 0.80 | None | 1.50 | None |
| Primary Diamine - (Hexamethylene Diamine) | None | None | None | 1.50 |
| Surfactant | 0.80 | 0.80 | 0.60 | 0.60 |
| Catalyst 3 | 0.005 | 0.005 | None | None |
| Isocyanate Index | 70 | 70 | 70 | 70 |

Molded foams N and C-3 were tested and their physical properties are shown in Table 5. Foam N which contained DIAK took considerably less force to crush than foam C-3 which did not. The foams of formulations C-4 and C-5 rose and then totally collapsed, confirming that foams of the invention are not achieved at levels of 1.5 parts by weight of primary diamine or its corresponding carbamate.

TABLE 5

Physical Properties of Molded Foams N, C-3, C-4, and C-5

| Molded Foam: | N | C-3 | C-4 | C-5 |
|---|---|---|---|---|
| Physical Properties: | | | | |
| Density, pcf | 1.1 | 1.2 | | |
| Force-To-Crush (75%)[1] | | | | |
| Reading 1 (lb/28.27 sq. in.) | 50 | 305 | Total Collapse | Total Collapse |
| Reading 2 (lb/28.27 sq. in.) | 30 | 205 | | |
| Reading 3 (lb/28.27 sq. in.) | 25 | 140 | | |

[1]Maximum force to crush foam 75% of its height with a 6" diameter foot (28.27 sq/in) using 1,000 lbs. load cell on an Instron Model 1125 apparatus. The test was repeated three times and all readings recorded.

EXAMPLE 6

Using substantially the procedures of Example 3, two more molded foams of the invention (O and P) were produced at low isocyanate indices of 50 and 60, both using 6.0 parts of water. The foam formulations employed were as follows:

| | Foam Formulation: | |
|---|---|---|
| Materials: | O | P |
| | Parts by Weight | |
| Polyol 1 | 96.00 | 96.00 |
| Polyol 2 | 4.00 | 4.00 |
| Diol (Diethylene Glycol) | 3.00 | 3.00 |
| Water | 6.00 | 6.00 |
| LMWP | 0.50 | 0.50 |
| Catalyst 1 | 0.36 | 0.17 |
| Catalyst 2 | 0.09 | 0.05 |
| Flame Retardant | 2.0 | 2.0 |
| Surfactant | 0.6 | 0.6 |
| Primary Diamine - (Hexamethylene Diamine) | 0.3 | 0.3 |
| Isocyanate | 50 Index | 60 Index |

Molded foams O and P were tested and their physical properties are shown in following Table 6.

TABLE 6

Physical Properties of Molded Foams O and P

| Molded Foam: | O | P |
|---|---|---|
| Physical Properties: | | |
| Core Density, pcf | 1.8 | 1.7 |
| Resiliency, % | 41 | 65 |
| Porosity, (CFM/sq. in.) | 2.9 | 3.7 |
| IFD, thickness, inches | 4.4 | 4.88 |
| 25% (lbs/50 sq. in.) | 3.5 | 7.5 |
| 50% (lbs/50 sq. in.) | 6.9 | 13.5 |
| 65% (lbs/50 sq. in.) | 11.2 | 20.8 |
| 65/25 Ratio | 3.1 | 2.8 |
| Tensile, psi | 6.6 | 8.2 |
| Elongation, % | 123 | 145 |
| Tear, pli | 0.58 | 0.57 |
| Comp. Set, 75% | 32 | 8 |
| Humid Aged Compression set, 50% | 30 | 21 |
| Wet Set (JIS), % | 43 | 22 |

EXAMPLE 7

This example demonstrates three foam formulations C-6, R, and S. Formulation C-6 is a control formulation containing no diamine. Formulation R is of this invention and contains hexamethylene diamine, and formulation S is not according to this invention; it contained piperazine—a secondary diamine. The foam formulations were as follows:

| | Foam Formulation: | | |
|---|---|---|---|
| | C-6 | R | S |
| Materials: | Parts by Weight | | |
| Polyol 1 | 96.00 | 96.00 | 96.00 |
| Polyol 2 | 4.00 | 4.00 | 4.00 |
| Diol - (Tripropylene Glycol) | 3.00 | 3.00 | 3.00 |
| Water | 6.50 | 6.50 | 6.50 |
| LMWP | 0.50 | 0.50 | 0.50 |
| Catalyst 1 | 0.29 | 0.29 | 0.29 |
| Catalyst 2 | 0.05 | 0.05 | 0.05 |
| Surfactant | 0.60 | 0.60 | 0.60 |
| Flame Retardant | 2.00 | 2.00 | 2.00 |
| Diamine[1]: | | | |
| Hexamethylene Diamine | None | 0.40 | None |
| Piperazine | None | None | 0.29 |
| Isocyanate | 60 Index | 60 Index | 60 Index |

[1]Hexamethylene Diamine and Piperazine were used at the same gram equivalent level.

Molded foams C-6, R and S were tested and their physical properties are shown in Table 7.

TABLE 7

Physical Properties of Molded Foams C-6, R and S

| | Foam Formulation: | | |
|---|---|---|---|
| | C-6 | R | S |
| Physical Properties: | | | |
| Density, pcf | 1.5 | 1.5 | — |
| Force-to-crush (75%) | | | |
| Reading 1 (lbs/28.27 sq. in.) | 255 | 80 | Total Collapse |
| Reading 2 (lbs/28.27 sq. in.) | 150 | 30 | |
| Reading 3 (lbs/28.27 sq. in.) | 80 | 20 | |

The above data show that molded foam R was superior to foam C-6 which required about 3–4 times more force to crush and foam S which totally collapsed. The preceding examples are meant only as illustrations; the following claims define the scope of the invention.

What is claimed is:

1. A flexible polyurethane foam formulation comprising a first polyol, a second polyol, an unhindered primary diamine or its corresponding carbamate, a diol, water, at least one catalyst, a foam stabilizer, and isocyanate wherein, a) the first polyol is a polyether polyol having 80% or more primary hydroxyl groups, a nominal functionality of at least 3, and an oxyethylene content of from about 10 to about 30% by weight;

b) the second polyol is a polymer/polyol formed by the in situ polymerization of at least one ethylenically unsaturated monomer in a third polyol;

c) the third polyol is a polyether polyol having 80% or more primary hydroxyl groups, a nominal functionality of at least 3, and an oxyethylene content of from about 10 to about 30% by weight;

d) the unhindered primary diamine or its corresponding carbamate is present in an amount of from about 0.1 to about 1.0 part per each 100 parts of total first and second polyol;

e) the diol has a molecular weight of 300 or less and is present in an amount of from about 1 to about 10 parts per each 100 parts of total first and second polyols;

f) the water is present in an amount of from about 4 to about 20 parts per each 100 parts of total first and second polyols;

g) the isocyanate is a mixture of toluene diisocyanate and either diphenylmethane diisocyanate or a polymeric diphenylmethane diisocyanate, or both; having an isocyanate index of about 50 to about 75 h) only the carbon dioxide which is generated by the catalyzed reaction of the isocyanate with the water is used to blow the foam formulation, and;

wherein the foam formulation, upon foaming, produces a foam having a density of less than about 2 pounds per cubic foot and a 25% Indentation Force Deflection value of less than about 10 pounds per 50 square inches, both measured in accordance with ASTM D-3574.

2. The formulation of claim 1 in which said first polyol, said third polyol, or both have 85% or more primary hydroxyl groups.

3. The formulation of claim 1 in which said first polyol is present in an amount of from about 80 to about 99 parts and said second polyol is present in an amount of from about 1 to about 20 parts, both amounts based on a total of 100 parts by weight of first and second polyol.

4. The formulation of claim 1 in which said first polyol is present in an amount of from about 90 to about 98 parts and said second polyol is present in an amount of from about 2 to about 10 parts, both amounts based on a total of 100 parts by weight of first and second polyol.

5. The formulation of claim 3 in which said second polyol contains about 40 to about 90 weight percent of said third polyol.

6. The formulation of claim 4 in which said second polyol contains from about 55 to about 65 weight percent of said third polyol.

7. The formulation of claim 1 in which said unhindered primary diamine or its corresponding carbamate is present in an amount of from about 0.3 to about 0.6 part per 100 parts of total first and second polyols.

8. The formulation of claim 1 in which said diol is present in an amount of from about 3 to about 6 parts per 100 parts of total first and second polyols.

9. The formulation of claim 1 in which said water is present in an amount of from about 5 to about 8 parts per 100 parts of total first and second polyols.

10. The formulation of claim 1 in which said isocyanate is a mixture of from about 60 to about 80 weight percent TDI and from about 40 to about 20 weight percent MDI.

11. The formulation of claim 1 in which said isocyanate is a mixture of from about 80 to about 75 weight percent TDI and from about 20 to about 25 weight percent MDI.

12. The formulation of claim 1 comprising catalyst in an amount of from about 0.1 to about 0.5 part per 100 parts of total first and second polyols.

13. The formulation of claim 1 comprising stabilizer in an amount of from about 0.4 to about 1.0 part per 100 parts of total first and second polyols.

14. The formulation of claim 1 comprising stabilizer in an amount of from about 0.5 to about 0.8 part per 100 parts of total first and second polyols.

15. The formulation of claim 1 in which said second polyol contains from about 10 to about 60 weight percent solids of styrene/acrylonitrile copolymer.

16. The formulation of claim 15 in which said styrene/acrylonitrile copolymer contains from about 50 to about 90 weight percent styrene recurring units and from about 50 to about 10 weight percent acrylonitrile recurring units.

17. A flexible polyurethane foam produced by foaming the foam formulation of claim 1.

18. A flexible polyurethane foam produced by foaming the foam formulation of claim 2.

19. A flexible polyurethane foam produced by foaming the foam formulation of claim 3.

20. A flexible polyurethane foam produced by foaming the foam formulation of claim 7.

21. A flexible polyurethane foam produced by foaming the foam formulation of claim 8.

22. A flexible polyurethane foam produced by foaming the foam formulation of claim 9.

23. A flexible polyurethane foam produced by foaming the foam formulation of claim 10.

24. A flexible polyurethane foam produced by foaming the foam formulation of claim 16.

25. The flexible polyurethane foam of claim 17 being foamed in a mold to produce a molded polyurethane foam.

* * * * *